UNITED STATES PATENT OFFICE 2,085,736

COMPOUNDS OF THE TRIPHENYLMETHANE SERIES

William S. Calcott and Paul W. Carleton, Penns Grove, and Edwin L. Mattison, Carneys Point, N. J., assignors to E. I. du Pont de Nemours & Company, Wilmington, Del., a corporation of Delaware No Drawing. Application December 6, 1933, Serial No. 701,234

13 Claims. (Cl. 260—67)

This invention relates to compounds of the triarylmethane and thiazine series, more particularly dyes of the triarylmethane and thiazine series, and a process for the production thereof.

It is an object of the present invention to produce new and improved compounds of the triarylmethane and thiazine series which are characterized by their dyeing power and clearness of their dyeings, and which have the great advantage that they are comparatively fast to light which is, as a rule, the principal disadvantage of these classes of dyes. Another object is the production of new and improved compounds useful as pharmaceutical products. A further object is the production of new and improved intermediates which may be used in the preparation of these compounds. A still further object is the provision of new and improved processes for producing compounds of the character above described. Other objects will appear hereinafter.

These objects are accomplished by the preparation of compounds having the following general formula:

$$R-X_n$$

in which R is a residue of a compound of the triarylmethane or thiazine series, X is —F or —CF$_3$, and $n$ is an integer, and by the preparation of new intermediates as more fully herein described.

The methods of preparation of compounds having the above formula may be as follows: (1) reaction of a tetra-alkyl-diaminobenzophenone with a suitable fluorinated Grignard reagent; (2) condensation of an aldehyde with an aromatic amine to the leuco compound, at least one of the reacting components containing fluorine, followed by oxidation to the dye with lead dioxide; (3) condensation of a tetra-alkyl-diaminobenzophenone with a fluorinated aryl hydrocarbon containing as a substituent also some other halogen, by means of metallic sodium; (4) condensation of aromatic amines, which may or may not be fluorinated, with formaldehyde to form methylene bases of aromatic amines which are oxidized to the hydrol form and then condensed with suitable fluorine-substituted amine; and (5) conversion of para-amino-dialkylanilines, which may or may not be fluorinated, to the thiosulfonic acids, followed by oxidation with a fluorinated tertiary amine to the thiazine.

The formulas of the following compounds are given to assist in naming some of the new compounds:

I.
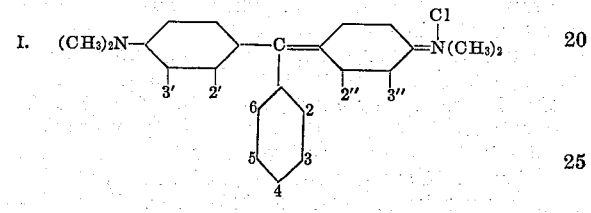
Malachite green

II.
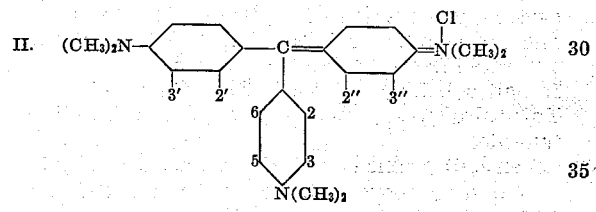
Crystal violet

III.
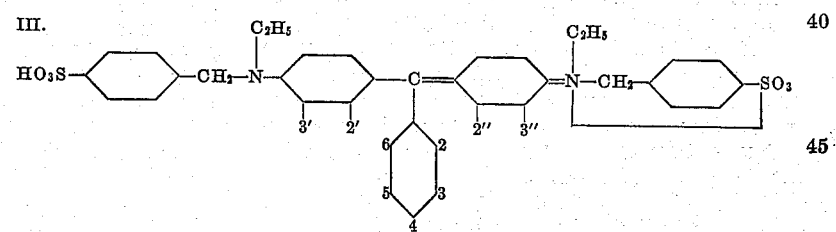
Pontacyl green BL ("Colour Index" No. 666)

IV.

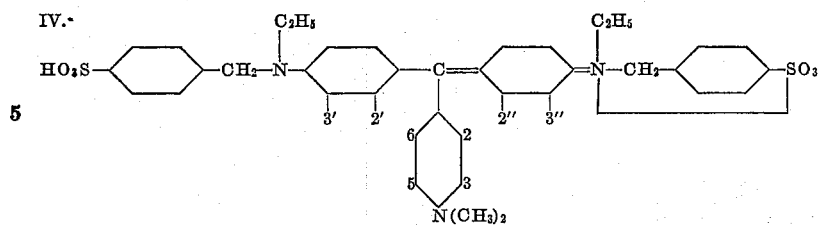

Pontacyl violet S4B ("Colour Index" No. 698)

V.

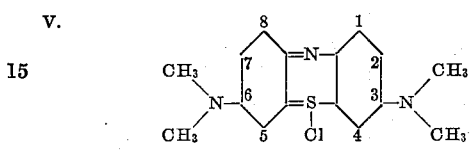

Methylene blue

The formulas according to the structures as given represent known dyestuffs. The numbered positions in the formulas designate the positions of substituents, at least one of which is —F or —$CF_3$ or any combination in which at least one fluorine atom or —$CF_3$ group is present.

While the invention is subject to considerable variation and modification in the manner of its practical application, particularly as regards the type of compounds falling within the invention and the method of preparation thereof, the following examples will serve to further illustrate how the invention may be practised.

Example I

Ninety and four-tenths (90.4) grams of meta-aminobenzotrifluoride were dissolved in a mixture of 400 cc. of water and 350 cc. of constant boiling hydrobromic acid. This solution was cooled and treated with a solution of 50 grams of sodium nitrite and 60 cc. of water. The diazo solution was decomposed with copper powder made from 400 grams of $CuSO_4.5H_2O$ and 102 grams of zinc dust. The mixture was steam-distilled. The heavy oil was separated from the distillate, dried over calcium chloride, and distilled to yield, as a new product, meta-bromobenzotrifluoride having a boiling point of 157° C. to 160° C.

A bromobenzotrifluoride was also prepared by introducing 10 grams of fine iron into 825 grams of benzotrifluoride and then adding slowly, with good agitation, 904 grams of bromine. The mixture, after hydrobromic acid was no longer evolved, was treated with a caustic soda solution and the resultant mixture filtered. The oil was separated from the filtrate, washed and distilled. It had a boiling point of 155.8° C. to 156.4° C. This, also, was presumably metabromobenzotrifluoride.

Ten (10) grams of meta-bromobenzotrifluoride, prepared as above described, were refluxed with 1.05 grams of magnesium and 20 grams of absolute ether until the magnesium dissolved. The solution was then added to an agitated mixture of 11.5 grams of tetramethyl-diaminobenzophenone in 400 cc. of absolute ether. A brown precipitate separated immediately. The mixture was stirred and the ether evaporated whereby 20.5 grams of the addition product were obtained. The addition product was converted to the dye by boiling with 10% acetic acid. The dye solution was filtered and the filtrate salted-out as a tar and dried below 60° C. The resultant dye, meta-trifluoromethyl-Malachite green, was noticeably superior to Malachite green in light-fastness and considerably bluer.

Example II

One hundred ninety-eight (198) grams of the hydrochloride of meta-aminobenzotrifluoride were dissolved in 750 cc. of water and 150 cc. of concentrated hydrochloric acid. Solution was obtained by heating. The mixture was cooled with ice and diazotized with a solution of 69 grams of sodium nitrite in 150 cc. of water. The diazo solution was treated with 166 grams of potassium iodide and the brown, heavy oil, after first removing the free iodine with sulfur dioxide, was separated and steam-distilled. The oil was dried over calcium chloride and fractionated, the resultant product, meta-iodobenzotrifluoride, being a new compound boiling at 182° C. to 183° C. It was a light tan liquid.

In a similar manner to that described in Example I, this meta-iodobenzotrifluoride may be converted to meta-trifluoromethyl-Malachite green.

Example III

Eleven and one-tenth (11.1) grams of para-iodofluorobenzene prepared from para-fluoroaniline by the Sandmeyer reaction were dissolved in 30 grams of dry ether, and 1.2 grams of magnesium and a crystal of iodine were added. The magnesium was soon dissolved, and the solution was added to a stirred solution of 13.4 grams of tetramethyldiaminobenzophenone in 250 cc. of absolute ether. A spongy, yellowish-brown precipitate was formed. The dye, para-fluoro-Malachite green, was isolated as in Example I and purified by re-dissolving in weak acid and re-salting. This dye was yellower than Malachite green and of similar light-fastness.

Example IV

Twenty grams of 2,5-difluoroaniline were dissolved in 125 cc. of water and 50 grams of concentrated hydrochloric acid. The mixture was cooled with 200 grams of ice and treated with a solution of 10.7 grams of sodium nitrite in 25 cc. of water. The hydrochloride gradually went into complete solution as the diazo body. The diazo solution was then treated with 25.7 grams of potassium iodide dissolved in 52 cc. of water. The mixture was stirred for about 15 minutes and treated with sulfur dioxide to remove iodine. It was then steam-distilled, dried over calcium chloride and fractionated to yield a new compound, 2,5-difluoro-iodobenzene having a boiling point of 181° C. to 183° C.

Nineteen (19) grams of the 2,5-difluoro-iodobenzene were dissolved in 40 grams of dry ether and 2 grams of magnesium added to form the Grignard reagent, following the procedure of Example I. By a condensation of the Grignard reagent with tetra-methyldiaminobenzophenone and the acidification of the addition product, the dye, 2,5-difluoro-Malachite green, was formed.

This dye was noticeably superior to Malachite green in light-fastness and much bluer in shade.

Example V

One hundred sixty (160) grams of meta-aminobenzotrifluoride were suspended in 1 liter of water, together with 175 grams of sodium carbonate at 70° C. to 75° C. To the suspension there were added 250 grams of dimethyl-sulfate. After all of the dimethyl-sulfate had been added, the mixture was heated to 90° C. The resultant mixture was cooled and the oil separated and distilled to yield a product boiling from 192° C. to 200° C. The dimethylaminobenzotrifluoride was separated and purified to produce a clear, yellow oil boiling from about 202.5° C. to about 203.5° C.

Thirty-eight (38) grams of this dimethylaminobenzotrifluoride were dissolved in 150 cc. of glacial acetic acid and treated at room temperature with 32 grams of bromine in 100 cc. of glacial acetic acid. The bromine was rapidly absorbed and toward the end of the reaction the hydrobromide of the tertiary amine separated in fine crystals. The hydrobromide was filtered off and dried. On treating it with sodium carbonate solution, bromo-meta-dimethylaminobenzotrifluoride was obtained. This substance was a heavy oil boiling at 265° C. to 267° C.

The bromo-meta-dimethylaminobenzotrifluoride was converted into the Grignard reagent and reacted with tetramethyldiamino benzophenone in a manner similar to that given in Example I to form trifluoromethyl-Crystal violet. The dye was isolated and purified as in Example I. It was less red than Crystal violet.

Example VI

The procedure of Example V was followed except that the alkylation of the meta-aminobenzotrifluoride was effected with diethyl-sulfate instead of dimethyl-sulfate, whereby the new compound, diethylaminobenzotrifluoride, having a boiling point of about 212° C. to about 215° C., was obtained. This can then be converted by the method given in Example V into the corresponding basic triphenyl methane dye.

In a manner similar to that described in Examples I to VI other halogen-substituted benzene and naphthalene compounds containing at least one fluorine atom and/or at least one —CF₃ group as a substituent and —Cl, —I or —Br as one of the other substituents may be employed. A further example of such a compound is 1,4-difluoro-3-iodobenzene.

Instead of tetramethyldiaminobenzophenone, other alkyl-aminobenzophenones and substituted derivatives thereof such as, for example, tetraethyldiaminobenzophenone, alkoxy-dialkylaminobenzophenones, nitrotetra-alkyl-diaminobenzophenones and alkoxy-tetra-alkyl-diaminobenzophenones may be employed.

Example VII

Nine (9) grams of meta-fluorobenzaldehyde were heated with 10 grams of zinc chloride and 19 grams of dimethylaniline on a steam bath for four hours. To the resultant mixture 100 cc. of water were added and sufficient sodium carbonate to make the solution alkaline. The mixture was then subjected to steam-distillation to remove unchanged reactants. The steamed liquor was then acidified with dilute hydrochloric acid to dissolve the leuco compound, and concentrated ammonia was added to form the soluble zinc ammonium hydroxide and precipitate the leuco meta-fluoro-Malachite green. This leuco compound was filtered off and re-crystallized from alcohol, yielding white crystals which had a melting point of about 97° C. to 98° C.

Two and five-tenths (2.5) grams of the above leuco compound in 4 cc. of water were dissolved by adding 2 cc. of concentrated hydrochloric acid. The solution was diluted with 20 cc. of water, 3 cc. of glacial acetic acid and 17 grams of ice. The cooled mixture was oxidized with 5.3 grams of 33.3% lead dioxide paste. After one-half hour the mixture was warmed to 45° C. and 1.5 grams of anhydrous sodium sulfate were added. The dye was filtered free from lead sulfate and the filtrate salted. The dye separated as a bronze tar. It was re-dissolved in 2% acetic acid and re-salted. This purified meta-fluoro-Malachite green was bluer than Malachite green and noticeably superior to it in light-fastness.

Example VIII

Ten (10) grams of ortho-fluorobenzaldehyde, 20 grams of dimethylaniline and 18 grams of zinc chloride were warmed on a water bath for several hours. The white, glistening crystals of the leuco body of ortho-fluoro-Malachite green were isolated as in Example VII. These crystals melted at 129° C.

The leuco body was oxidized as in Example VII. The resultant dye, ortho-fluoro-Malachite green, was considerably superior to Malachite green in light-fastness and also much bluer. This dye is much yellower than ortho-chloro-Malachite green, which is commercially known as Rhoduline blue 6G.

Example IX

Fifty (50) grams of meta-aminofluorobenzene were suspended in 500 cc. of water and 187 grams of sodium carbonate. The suspension was then treated at 50° C. with 110 grams of dimethyl-sulfate. Forty-two (42) grams of an oily product were obtained. This was treated with dimethyl-sulfate as before, except that 30 grams of dimethyl-sulfate were used. The oil was again separated and steam-distilled. The meta-dimethylaminofluorobenzene was separated from the meta-monomethylaminofluorobenzene. The dimethyl derivative is a yellow-orange oil having a boiling point of 198° C. to 200° C.

Seven (7) grams of meta-dimethylaminofluorobenzene, prepared as above described, were heated on a steam bath with 5.5 grams of benzaldehyde and 5 grams of zinc chloride. The leuco body of 2′,2″-difluoro-Malachite green, consisting of pinkish-white crystals having a melting point of 111° C. to 112° C., was isolated as in Example VII. Five (5) grams of the leuco body were oxidized as in Example VII to produce the dye 2′,2″-difluoro-Malachite green. This dye is yellower than Malachite green and noticeably superior in light-fastness.

Example X

Two hundred forty-eight (248) grams of 2-methyl-3-chloro-aniline were added to a mixture of 665 cc. of water and 265 grams of concentrated hydrochloric acid. The slurry of the hydrochloride was heated to 70° C. and then cooled with ice to 30° C. Three hundred forty (340) grams of concentrated hydrochloric acid were then added and the mixture cooled with ice to 0° C. The resultant mixture was treated below 5° C. with a solution of 125 grams of sodium nitrite in 295 cc. of water. The hydrochloride went into solution. It was then treated with an NaBF₄ solution made by dissolving 240 grams of boric acid in 532 grams of 48% hydrofluoric acid and adding at a low temperature a solution of 270 grams of sodium hydroxide in 375 cc. of water. The white crystalline precipitate of the diazonium-borofluoride was formed immediately. It was filtered off, washed once with alcohol and twice with ether, and dried at 48° C.

The dry 2-methyl-3-chlorophenyl-diazonium-borofluoride was decomposed by slowly heating in a distilling flask. Nitrogen and boron trifluoride were evolved and the mixture became a pasty mass which later liquefied. The liquid was distilled, washed with caustic soda and oil separated, dried and fractionated, yielding 2-methyl-3-chlorofluorobenzene having a boiling point of 155° C. to 156° C.

To 102 grams of 2-methyl-3-chlorofluorobenzene were added 5 grams of phosphorus pentachloride and dry chlorine was passed through the mixture at a temperature gradually rising from a refluxing temperature of 155° C. to 156° C. to a temperature of about 185° C. until the increase in weight was 45.2 grams. The clear, yellow liquid was distilled, a few grams of material distilling below 225° C. but nearly all distilled at 228° C. to 230° C. This latter substance was a pale, yellow liquid, being most probably the new compound 2-dichloromethyl-3-chlorofluorobenzene. This substance was hydrolyzed to the aldehyde by sulfuric acid and was recovered by steam-distillation.

The aldehyde was purified by converting it to the sodium bisulfite addition product and decomposing it by steam-distillation from a sodium carbonate solution. The new compound, 2-fluoro-6-chlorobenzaldehyde, was obtained as an oil which solidified on cooling. The solid product had a melting point of 35° C. to 36° C.

Four and two-tenths (4.2) grams of 2-fluoro-6-chloro-benzaldehyde were condensed with 7 grams of meta-fluorodimethylaniline in the presence of 5 grams of zinc chloride, as described in Example VII, to produce the leuco body of 2,2′,2″-trifluoro-6-chloro-Malachite green, which is a new compound existing in the form of a pinkish-white solid having a melting point of 137° C. to 138° C.

Two and five-tenths (2.5) grams of this leuco body were oxidized as in Example VII. The resultant dye, 2,2′,2″-trifluoro-6-chloro-Malachite green is very much superior in light-fastness to Malachite green and very much bluer than Malachite green in shade.

Example XI

Four (4) grams of 6-fluoro-2-chlorobenzaldehyde, 7 grams of dimethylaniline and 5 grams of zinc chloride were heated for 5 hours on a water bath. The new compound, which was the leuco body of 6-fluoro-2-chloro-Malachite green was isolated as in Example VII in the form of fine, white crystals having a melting point of 121° C. to 123° C. Oxidation of this leuco body was carried out according to the general precedure described in Example VII. The resultant dye, 6-fluoro-2-chloro-Malchite green, was considerably bluer than Malachite green and noticeably superior in light-fastness.

Example XII

To 18.2 grams of 100% ethylbenzylanilinesulfonic acid were added 23 cc. of water, and the solution heated with 5 grams of meta-fluorobenzaldehyde on a water bath for twenty-four hours. The mixture was steam-distilled to remove excess meta-fluorobenzaldehyde and the solution was made up to 160 grams.

Eighty (80) grams of the above leuco solution were added to 300 grams of ice and water sufficient to maintain a temperature of 10° C. to 20° C. To the cooled solution 3.4 grams of 95% sulfuric acid were added, followed by 23 grams of 33.3% lead dioxide paste and 6 grams of glacial acetic acid. The resultant mixture was agitated one-half hour, then 1.6 grams of sulfuric acid were added and the mixture further agitated for fifteen minutes. The solution was filtered and the filtrate salted. The solid product was filtered, washed, salted and dried at a temperature not above 65° C. It was purified by re-dissolving, filtering and evaporating to dryness. The resultant dye, meta-fluoro-Pontacyl green BL was tested against Pontacyl green BL and was found to be noticeably yellower and appreciably brighter.

According to procedures similar to those described in Examples VII to XII, inclusive, other compounds of the triaryl-methane series containing fluorine may be prepared. In general, benzaldehydes containing at least one fluorine atom and/or at least one —CF₃ group as a substituent and which may be further substituted may be employed. Benzaldehydes not containing fluorine may be reacted with aromatic amines containing fluorine. Further examples of compounds falling within the invention and intermediates from which they may be prepared are illustrated by the following table:

Table A

| Aldehyde | Amine | Color compound |
|---|---|---|
| Ortho-fluoro-benzaldehyde. | N,N-ethylbenzyl-anilinesulfonic acid. | Ortho-fluoro-Pontacyl green BL (III). |
| 2,6-difluoro-benzaldehyde. | ___do___ | 2,6-difluoro-Pontacyl green BL (III). |
| 2,3-difluoro-benzaldehyde. | ___do___ | 2,3-difluoro-Pontacyl green BL (III). |
| 2-fluoro-3-chloro-benzaldehyde. | ___do___ | 2-fluoro-3-chloro-Pontacyl green BL (III). |
| 2-fluoro-4-chloro-benzaldehyde. | ___do___ | 2-fluoro-4-chloro-Pontacyl green BL (III). |
| 2-fluoro-6-chloro-benzaldehyde. | ___do___ | 2-fluoro-6-chloro-Pontacyl green BL. |
| 2,4-difluoro-benzaldehyde. | ___do___ | 2,4-difluoro-Pontacyl green BL (III). |
| 2,5-difluoro-benzaldehyde. | ___do___ | 2,5-difluoro-Pontacyl green BL (III). |
| Ortho-chloro-benzaldehyde. | Meta-fluorodimethylaniline. | 2-chloro-2′,2″-difluoro-Malachite green (I). |
| Ortho-sulfobenzaldehyde. | ___do___ | 2-sulfo-2′,2″-difluoro-Malachite green. |
| 2,5-dichloro-benzaldehyde. | ___do___ | 2,5-dichloro-2′,2″-difluoro-Malachite green (I). |
| 2,5-difluloro-benzaldehyde. | N-monomethyl-ortho-toluidine. | 4′,4″-monomethyl-amino-3′,3″-dimethyl-2,5-difluoro-triphenylmethyl-hydrochloride (I). |
| Para-nitro-benzaldehyde. | Meta-fluorodimethylaniline. | 4-nitro-2′,2″-difluoro-Malachite green (I). |
| Ortho-chloro-meta-nitro-benzaldehyde. | ___do___ | 2-chloro-3-nitro-2′,2″-difluoro-Malachite green (I). |
| Ortho-fluoro-benzaldehyde. | N,N-methylbenzylaniline sulfonic acid. | 2-fluoro-4′,4″-dimethyl-4′,4″-disulfo-benzyldiamino-triphenyl-carbinol anhydride. |

The new dyes containing fluorine may be further treated to produce other dyes according to methods known in the art. Thus, fluoro-Crystal violets may be reacted with alkyl halides.

Example XIII

Thirty (30) grams of ortho-chlorobenzotrifluoride were dissolved in 150 grams of dry benzene, and to the mixture 40 grams of tetramethyldiaminobenzophenone and 7 grams of sodium were added. The mixture was heated under reflux at 70° C. for twenty-one hours. It was then heated on a steam bath to remove the benzene and, after cooling, the residue was treated with a small amount of methyl alcohol to remove unchanged sodium. The dye was then isolated by extraction with a 10.3% solution of oxalic acid, followed by evaporation of the solution. It was purified by re-solution and evaporation. This dye, ortho-trifluoromethyl-Malachite green, was very much bluer than Malachite green.

Instead of tetramethyldiaminobenzophenone, other tetra-alkyldiaminobenzophenones, including substituted derivatives, may be used in the foregoing examples. Instead of ortho-chlorobenzotrifluoride, other bromo-, iodo- and chlorobenzene and naphthalene derivatives containing fluorine and/or —$CF_3$ groups may be employed Further examples are illustrated by the following table:

Table B

| Ketone derivative | Halogen derivative | Color compound |
| --- | --- | --- |
| Tetramethyldiaminobenzophenone. | 2-methyl-3-chloro-fluorobenzene. | 2-methyl-3-fluoro-Malachite green. |
| Do | 1,4-difluoro-3-iodo-benzene. | 2,5 - difluoro-Malachite green. |
| Tetra-ethyldiamino-benzophenone. | Ortho-chlorobenzotrifluoride. | 2 - trifluoromethyl - Brilliant green. |

Example XIV

Fifty-eight and two-tenths (58.2) grams of ethylbenzylaniline-sulfonic acid in 240 cc. of water and 8.8 grams of 37% formaldehyde were condensed to the methane base. To the resultant condensation mixture, 12.5 grams of 30% caustic soda were added at 70° C.

One-fifth by volume of the above solution was added to 200 cc. of water and 100 grams of ice. The cooled solution was treated with 1.6 grams of potassium permanganate and 5 grams of meta-diethylaminobenzotrifluoride, followed by 1 gram of sulfuric acid and 3.5 grams of sodium dichromate. After formation, the dye was salted-out with 40 grams of sodium chloride. This dye, trifluoromethyl-Pontacyl violet is much bluer in shade than Pontacyl violet.

The foregoing procedure may be carried out with other alkyl-aryl-sulfo-arylamines or their substituted derivatives. In place of diethyl-meta-aminobenzotrifluoride, other ortho or meta or di-substituted ortho and/or meta-dialkylanilines containing fluorine may be used.

Example XV

A solution of para-aminodimethylaniline, obtained from 16 grams of dimethylaniline by nitrosation and reduction, was treated with 33.5 grams of sodium thiosulfate in 40 cc. of water. This was immediately followed by the slow addition of a solution of 26.4 grams of sodium dichromate in 40 cc. of water. After two minutes, 19 grams of meta-dimethylaminobenzotrifluoride in 24 grams of concentrated hydrochloric acid were added all at once, followed by a solution of 26.4 grams of sodium dichromate in 40 cc. of water. The solution, after stirring seven minutes, was treated with a solution of 1.5 grams of copper sulfate in 20 cc. of water. The resultant solution was heated almost to boiling, and filtered. The filtrate was salted with sodium chloride and zinc chloride to precipitate the dye, 1-trifluoromethyl-Methylene blue, which may also be called 3,6-tetramethyldiamino-1-trifluoromethyldiphenazthionium chloride (for nomenclature see structural Formula V). This dye dyed tannined cotton a bright blue shade.

In carrying out the procedure of Example XV, in place of para-aminodimethylaniline other aromatic primary amines having at least one position adjacent the primary amine-nitrogen atom open for condensation and which may contain fluorine may be used. Instead of meta-trifluoromethyldimethylaniline other di-alkyl-anilines or substituted derivatives having one meta- and one para-position open for condensation and which contain at least one fluorine atom as a nuclear substituent and/or at least one —$CF_3$ group may be employed. The latter compounds, however, need not contain fluorine provided the other component of the dye, namely the primary amine, contains fluorine. Further examples of such compounds are illustrated in the following table:

Table C

| Primary amine | Combined with | Color compound |
| --- | --- | --- |
| Para-aminodimethyl-aniline. | Meta-fluorodimethyl-aniline. | 3,6 - tetramethyldiamino-1-fluoro-di-phenazthionium-chloride. |
| Para - aminodiethyl - aniline. | Meta-trifluoromethyl-diethylaniline. | 3,6 - tetraethyldiamino-1-trifluoromethyl - diphenazthionium-chloride. |
| Para-aminodimethyl-aniline. | Ortho-trifluoromethyl-dimethylaniline. | 3,6 - tetramethyldiamino-2- or 4-trifluoromethyl - diphenazthionium chloride. |
| Para-aminodimethyl-aniline. | Ortho-fluorodimethyl-aniline. | 3,6 - tetramethyldiamino-2- or 4-fluorodiphenazthio - nium-chloride. |
| Para-aminodimethyl-aniline. | 2,5 - difluorodimethyl-aniline. | 3,6-tetramethyldiamino-1,4-difluorodiphenazthionium-chloride. |
| Para-amino-meta-trifluoromethyl - di - methylaniline. | Meta-trifluoromethyl - dimethylaniline. | 3,6 - tetramethyldiamino-1,8-di-(trifluoromethyl) - di - phenazthionium-chloride. |
| Para-amino - meta - fluorodimethyl-aniline. | Meta-fluorodimethyl-aniline. | 3,6 - tetramethyldiamino-1,8-difluorodiphenazthionium-chloride. |
| Para - amino - meta - fluorodimethyl-aniline. | Meta-trifluoromethyl - dimethylaniline. | 3,6 - tetramethyldiamino-1-trifluoromethyl-8-fluorodiphenazthionium-chloride. |
| 1 - methyl - 2 - mono - ethylamino-5-aminobenzene. | Meta-fluorodimethyl-aniline. | 3-dimethylamino-6-monoethylamino-7-methyl-1-fluorodiphenazthionium-chloride. |
| 1 - methyl-2-mono - ethylamino-5-aminobenzene. | Meta-trifluoromethyl-diethylaniline. | 3 - diethylamino - 6 - monoethylamino-7-methyl-1-trifluoro - methyl - di - phenazthionium-chloride. |

Other new intermediates which have been prepared in the practise of the invention are given in Examples XVI and XVII, following:

Example XVI

Nine hundred sixty-four (964) grams of 2-chloro-5-aminobenzotrifluoride were dissolved in a mixture of 2600 grams of water and 1550 grams of concentrated hydrochloric acid. Ice was added to cool to 5° C., and the mixture was treated with a solution of sodium nitrite made by dissolving 343 grams of sodium nitrite in 1500 cc. of water. The diazo solution was added to a cuprous cyanide solution at 90° C. The cuprous cyanide solution was made by dissolving 660 grams of $CuSO_4.5H_2O$ in 2640 grams of water, and adding to it 740 grams of potassium cyanide. After one-half hour at 80° C. to 90° C., the mixture was steam-distilled. A greenish-white solid distilled. It was distilled un-

Example XVII

Twenty-six (26) grams of 2-chloro-5-cyano-benzotrifluoride were dissolved in 500 grams of 96% sulfuric acid and treated with 13 grams of potassium nitrate at 19° C. to 20° C. The mixture was kept below 30° C. during the addition of the potassium nitrate. It was stirred overnight and drowned in a slurry of ice and water. A solid separated and was re-crystallized from water as white needles having a melting point of 121° C. to 122° C.

Preferred types of dyes falling within the invention may be illustrated by the following general formulas:

(A) 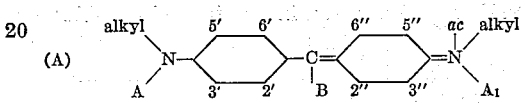

wherein A and A₁ represent hydrogen, alkyl or radicals of the benzene series, ac represents the residue of an acid, B represents a radical of the benzene or naphthalene series, the numbered positions may have monovalent substituents in place of hydrogen, and at least one of the numbered positions or B contains as a substituent a flourine atom or a —CF₃ group:

(B) 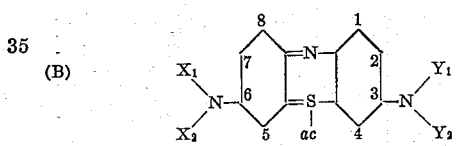

wherein X₁, X₂, Y₁, and Y₂ represent the same or different atoms or radicals taken from the group consisting of hydrogen, alkyl, and radicals of the benzene series, ac represents the residue of an acid, and the numbered positions represent hydrogen or monovalent substituents, at least one of which is a fluorine atom or a —CF₃ group.

Of the new intermediates prepared in accordance with the invention, special mention may be made of those having the following general formula:

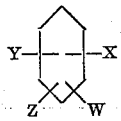

wherein X represents at least one fluorine atom or —CF₃ group, Z represents hydrogen or a halogen atom other than fluorine, W represents hydrogen or —CN, and Y represents

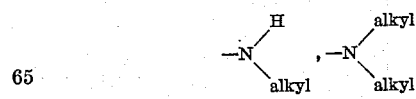

—Br, —I or, when Z is a halogen atom other than fluorine, Y may represent —alkyl, —CHO,

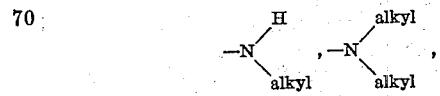

NO₂, —CHCl₂ or —CN.

Compounds herein described are desirable additions to dyes and intermediates of the triarylmethane and thiazine series. Most of the dyes are much faster to light than the parent unfluorinated dyes and, in some cases, are of unusual shade. For example, 2':2''-difluoro-Malachite green is yellower than the yellowest basic green color, Brilliant green, and considerably yellower than Victoria green. Para-fluoro-Malachite green is also yellower than Victoria green. Furthermore, the basic greens as well as Methylene blue have been known for some time to have remarkable bactericidal power. The introduction of fluorine, in general, tends to increase this power. Hence, many of these new compounds have desirable properties for the preparation of pharmaceutical products.

The term "auxo-chromic" is employed throughout the specification and claims to mean a group or atom that varies or intensifies the color of a chromofore or develops a color from a chromogen.

As many apparently widely different embodiments of this invention may be made without departing from the spirit and scope thereof, it is to be understood that we do not limit ourselves to the specific embodiments thereof except as defined in the following claims.

We claim:

1. Compounds of the following general formula:

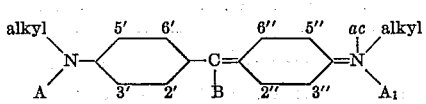

wherein A and A₁ represent a member of the group consisting of hydrogen, alkyl, and radicals of the benzene series, ac represents the negative radical of an acid, B represents a member of the group consisting of radicals of the benzene and naphthalene series, and in at least one of the positions represented by number and the letter B there is as a substituent a member of the group consisting of fluorine and —CF₃.

2. In a process of producing dyes of the triarylmethane series containing fluorine, the step which comprises condensing an aldehyde of the benzene series with an N-alkyl aromatic amine, at least one of the reacting components containing nuclearly substituted fluorine.

3. The process of producing dyes of the triarylmethane series containing fluorine which comprises condensing an aldehyde with an N-alkyl aromatic amine, at least one of the reacting components containing nuclearly substituted fluorine, and oxidizing the resultant product.

4. Compounds of the following general formula:

wherein R represents a triarylmethane radical, X represents a nuclear substituent of the radical R taken from the group consisting of —F and —CF₃, and n represents an integer.

5. Compounds of the following general formula:

wherein R represents a triphenylmethane radical, X represents a nuclear fluorine atom and n represents an integer.

6. Compounds of the following general formula:

wherein R represents a triphenylmethane radical, X represents a nuclear —CF$_3$ group, and $n$ represents an integer.

7. Compounds of the following general formula:

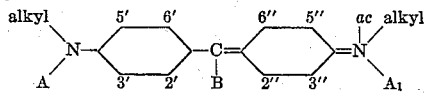

wherein A and A$_1$ represent a member of the group consisting of hydrogen, alkyl, and radicals of the benzene series, ac represents the negative radical of an acid, B represents a member of the group consisting of radicals of the benzene and naphthalene series, and in at least one of the positions represented by number and letter B there is a substituent fluorine atom.

8. Compounds of the following general formula:

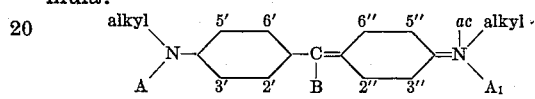

wherein A and A$_1$ represent a member of the group consisting of hydrogen, alkyl, and radicals of the benzene series, ac represents the negative radical of an acid, B represents a member of the group consisting of radicals of the benzene and naphthalene series and in at least one of the positions represented by number and the letter B there is as a nuclear substituent a —CF$_3$ group.

9. Compounds of the following general formula:

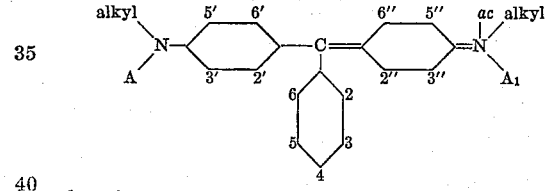

wherein A and A$_1$ represent a member of the group consisting of hydrogen, alkyl, and radicals of the benzene series, ac represents the negative radical of an acid, and at least one of the numbered positions has its hydrogen replaced by a monovalent auxo-chromic substituent at least one of which is a nuclear fluorine atom.

10. Compounds of the following general formula:

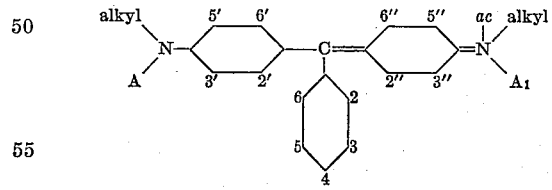

wherein A and A$_1$ represent a member of the group consisting of hydrogen, alkyl, and radicals of the benzene series, ac represents the negative radical of an acid, and at least one of the numbered groups has its hydrogen replaced by a monovalent auxo-chromic substituent at least one of which is a nuclear —CF$_3$ group.

11. Compounds of the following general formula:

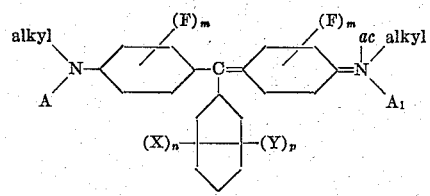

wherein A and A$_1$ represent a member of the group consisting of hydrogen, alkyl, and a radical of the benzene series, ac represents the negative radical of an acid, X represents a member of the group consisting of —F and —CF$_3$, Y represents a halogen atom other than fluorine, $m$ and $n$ are 0 or an integer, but may not both be 0 at the same time, and $p$ is 0 or an integer.

12. Compounds of the following general formula:

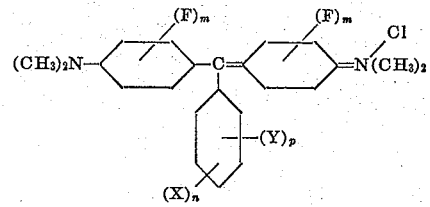

wherein X represents a member of the group consisting of —F and —CF$_3$, Y represents a halogen atom other than fluorine, $m$ and $n$ are 0 or an integer but may not both be 0 at the same time, and $p$ is 0 or an integer.

13. In a process of producing compounds of the triarylmethane series containing fluorine, the step which comprises condensing an aromatic aldehyde with an aromatic amine, at least one of the reacting components containing as a nuclear substituent at least one radical selected from the group consisting of —F or —CF$_3$.

WILLIAM S. CALCOTT.
PAUL W. CARLETON.
EDWIN L. MATTISON.